United States Patent
Li et al.

(10) Patent No.: US 10,676,361 B2
(45) Date of Patent: Jun. 9, 2020

(54) METHOD AND REAGENT FOR IMPROVING YIELD OF SELECTIVE DISPERSION OF SEMICONDUCTING CARBON NANOTUBES

(71) Applicant: Suzhou Institute of Nano-Tech and Nano-Bionics (Sinano), Chinese Academy of Sciences, Suzhou (CN)

(72) Inventors: Qingwen Li, Suzhou (CN); Dan Liu, Suzhou (CN); Song Qiu, Suzhou (CN); Jin Zhang, Suzhou (CN); Hehua Jin, Suzhou (CN); Hongbo Li, Suzhou (CN)

(73) Assignee: Suzhou Institute of Nano-Tech and Nano-Bionics (Sinano), Chinese Academy of Sciences, Suzhou (CN)

( * ) Notice: Subject to any disclaimer, the term of this patent is extended or adjusted under 35 U.S.C. 154(b) by 65 days.

(21) Appl. No.: 16/307,034

(22) PCT Filed: Apr. 28, 2017

(86) PCT No.: PCT/CN2017/082305
§ 371 (c)(1),
(2) Date: Dec. 4, 2018

(87) PCT Pub. No.: WO2017/215358
PCT Pub. Date: Dec. 21, 2017

(65) Prior Publication Data
US 2019/0218100 A1    Jul. 18, 2019

(30) Foreign Application Priority Data
Jun. 12, 2016    (CN) .......................... 2016 1 0408071

(51) Int. Cl.
*C01B 32/172* (2017.01)
*C01B 32/158* (2017.01)
(Continued)

(52) U.S. Cl.
CPC .......... *C01B 32/172* (2017.08); *C01B 32/158* (2017.08); *C01B 32/159* (2017.08);
(Continued)

(58) Field of Classification Search
CPC ... C01B 32/159; C01B 32/172; C01B 32/174; C01P 2002/02; C01P 2002/22; C01P 2002/82; C01P 2006/40
See application file for complete search history.

(56) References Cited

U.S. PATENT DOCUMENTS

2014/0174991 A1* 6/2014 Khripin ................. B01D 15/02
                                                                209/3.1
2016/0200578 A1* 7/2016 Ding ..................... B82Y 30/00
                                                                423/447.1

FOREIGN PATENT DOCUMENTS

CN            103112840 B   *   4/2015
WO    WO-2015024115 A1   *   2/2015    ......... B01D 11/0288

OTHER PUBLICATIONS

Fagan, Jeffrey A., et al. "Centrifugal length separation of carbon nanotubes." Langmuir 24.24 (2008): 13880-13889.*

* cited by examiner

*Primary Examiner* — Richard M Rump
(74) *Attorney, Agent, or Firm* — Wang Law Firm, Inc.

(57) ABSTRACT

The disclosure discloses a method and reagent for improving a yield of selective dispersion of semiconducting carbon nanotubes. The method comprises: fully mixing single walled carbon nanotube samples, a first polymer, and a second polymer in a solvent to form a liquid phase mixed system, enabling the single walled carbon nanotube samples to be fully dispersed in the liquid phase mixed system, centrifuging the liquid phase mixed system, and separating a supernatant to implement selective separation of the semiconducting single walled carbon nanotubes; wherein both
(Continued)

the first polymer and the second polymer can specifically bind to the semiconducting single walled carbon nanotubes; a speed of binding the first polymer to the semiconducting single walled carbon nanotubes is greater than a speed of binding the second polymer to the semiconducting single walled carbon nanotubes; and a binding strength between the first polymer and the semiconducting single walled carbon nanotubes is less than a binding strength between the second polymer and the semiconducting single walled carbon nanotubes. The disclosure can realize high-yielding selective separation of high-purity and highly dispersive semiconductoring single walled carbon nanotubes, thereby reducing costs, and improving the repeatability and stability of the separation.

14 Claims, 3 Drawing Sheets

(51) Int. Cl.
*C01B 32/159* (2017.01)
*C01B 32/174* (2017.01)

(52) U.S. Cl.
CPC ........ *C01B 32/174* (2017.08); *C01B 2202/02* (2013.01); *C01B 2202/22* (2013.01); *C01P 2002/82* (2013.01); *C01P 2006/40* (2013.01)

US 10,676,361 B2

METHOD AND REAGENT FOR IMPROVING YIELD OF SELECTIVE DISPERSION OF SEMICONDUCTING CARBON NANOTUBES

TECHNICAL FIELD

The disclosure relates to a method for separating semiconducting single walled carbon nanotubes, especially relates to a method for improving a yield of selective dispersion of semiconducting single walled carbon nanotubes, and belongs to the technical field of carbon nanotube.

BACKGROUND

The carbon nanotube (CNT for short) is a novel carbon structure discovered for the first time in 1991, and is a tube obtained by rolling the graphene sheet formed by carbon atoms. The carbon nanotube has a small diameter, has a large length to diameter ratio, and is considered as a quasi-one-dimensional material. Due to excellent electrical properties, and superstrong mechanical properties, the carbon nanotube has attracted great attentions in the material field.

Due to excellent electrical properties, the single walled carbon nanotubes (SWCNTs) have wide application prospects in the electronic field, and are important candidate materials for the next generation of integrated circuit semiconductor materials. In general, the synthesized single walled carbon nanotubes (SWCNTs) are mixtures of metallic single walled carbon nanotubes (m-SWCNTs) and semiconducting single walled carbon nanotubes (s-SWCNTs), thereby seriously hindering use of the semiconducting single walled carbon nanotubes. Therefore, it is especially important to efficiently separate the semiconducting single walled carbon tubes from the single walled carbon nanotubes.

At present, the separation method mainly includes a column chromatography separation method, an ultra-high speed density gradient centrifugation method, an aqueous biphase extraction method, and a selective dispersion method. Because of simple operation, ultra-high semiconductor purity, and low losses of single walled carbon tubes, the selective dispersion has developed rapidly, but the low yield is one of the bottlenecks of this method.

At present, there is still a method of selectively dispersing and separating single walled carbon nanotubes using single polythiophene or single polycarbazole. However, the semiconducting single walled carbon nanotubes obtained by the single thiophene method have high yield, but low purity, while the semiconducting single walled carbon nanotubes obtained by the single polycarbazole method have high purity, but low yield.

Thus, how to further improve the existing carbon nanotube separation method according to its disadvantages, to achieve high-yielding separation of high-purity semiconducting single walled carbon nanotubes, becomes a novel research direction for researchers in the industrial circle at present.

SUMMARY

A main object of the disclosure is to provide a method and reagent for improving a yield of selective dispersion of semiconducting single walled carbon nanotubes, to overcome the disadvantages of existing technologies.

In order to achieve the foregoing object of the disclosure, the technical solution adopted in the disclosure includes:

An embodiment of the disclosure provides a method for improving a yield of selective dispersion of semiconducting carbon nanotubes, including:

fully mixing single walled carbon nanotube samples, a first polymer, and a second polymer in a solvent to form a liquid phase mixed system, enabling the single walled carbon nanotube samples to be fully dispersed in the liquid phase mixed system, centrifuging the liquid phase mixed system, and separating a supernatant to implement selective separation of the semiconducting single walled carbon nanotubes; where both the first polymer and the second polymer can be dissolved in the solvent, and can specifically bind to the semiconducting single walled carbon nanotubes; a speed of binding the first polymer to the semiconducting single walled carbon nanotubes is greater than a speed of binding the second polymer to the semiconducting single walled carbon nanotubes; and a binding strength between the first polymer and the semiconducting single walled carbon nanotubes is less than a binding strength between the second polymer and the semiconducting single walled carbon nanotubes.

Preferably, the first polymer includes, but is not limited to, polycarbazole (PCO), polyfluorene, or the like.

Preferably, the second polymer includes, but is not limited to, polythiophene (rr-P3DDT), fluorene-thiophene copolymer, or the like.

Preferably, a mass ratio of the first polymer to the second polymer is 0.5-2.0:1.

An embodiment of the disclosure further provides a reagent for selective separation of semiconducting carbon nanotubes, including a first polymer and a second polymer capable of specifically binding to the semiconducting single walled carbon nanotubes in a selected liquid phase environment. A speed of binding the first polymer to the semiconducting single walled carbon nanotubes is greater than a speed of binding the second polymer to the semiconducting single walled carbon nanotubes, and a binding strength between the first polymer and the semiconducting single walled carbon nanotubes is less than a binding strength between the second polymer and the semiconducting single walled carbon nanotubes; and the selected liquid phase environment includes a mixed solution of the first polymer, and the second polymer.

Compared with the existing technologies, the advantages of the disclosure include:

1. A method for improving a yield of selective separation of semiconducting single walled carbon nanotubes provided by the disclosure designs a dual polymer system, and can achieve high-yielding separation of high-purity, and highly dispersive semiconducting single walled carbon nanotubes from the dynamic perspective of the dispersion process by a method for dispersing single walled carbon nanotubes using a special combination of two or more polymers;

2. A method for improving a yield of selective separation of semiconducting single walled carbon nanotubes provided by the disclosure is high-yielding, greatly reduces costs in selective separation of semiconductoring single walled carbon nanotubes, and improves the repeatability and stability of the separation;

3. A reagent for selective separation of semiconducting carbon nanotubes provided by the disclosure is mainly a dual polymer system, has wide sources of starting materials, and can be used for high-yielding, and efficient selective separation of high-purity, and highly dispersive semiconducting single walled carbon nanotubes; and 4. The high-purity semiconducting single walled carbon nanotubes obtained in the disclosure can be used for preparing high-performance electronic devices.

DETAILED DESCRIPTION OF EMBODIMENTS

Figure 1:
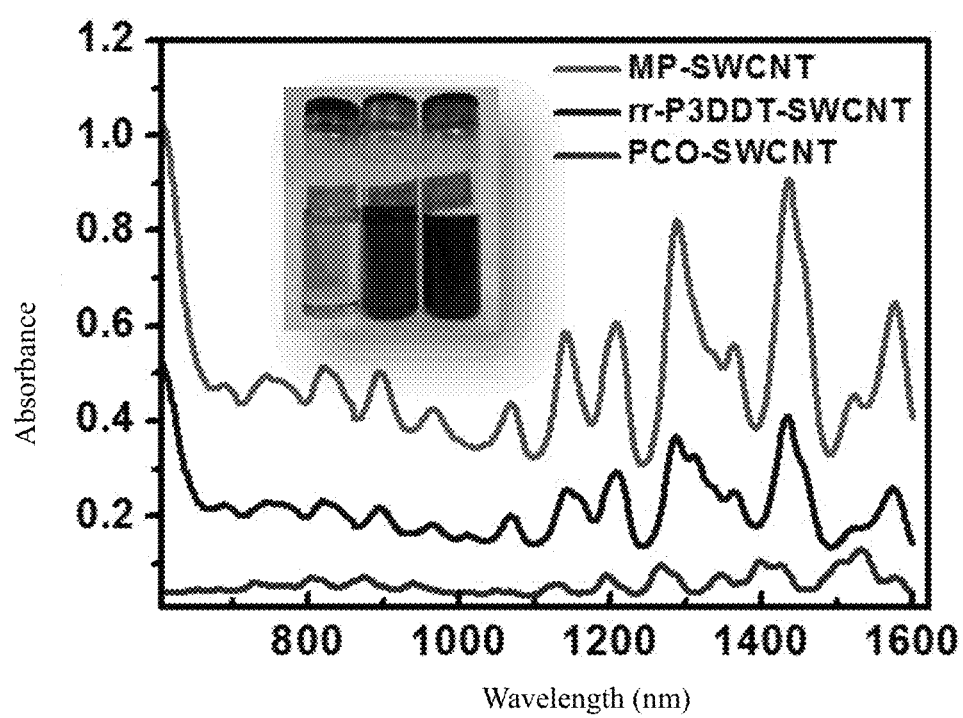
FIG. 1 is absorption spectra of single walled carbon nanotubes dispersively separated respectively using PCO, rr-P3DDT, and a mixture of PCO/rr-P3DD.

In view of the disadvantages in the existing technologies, the inventor of the disclosure has concluded the technical solution of the disclosure through prolonged researches and much practice. The technical solution is mainly a method for improving a yield of selective separation of semiconducting carbon nanotubes, which designs a dual polymer system, and can achieve high-yielding separation of high-purity semiconducting single walled carbon nanotubes from the dynamic perspective of the dispersion process by a method for dispersing single walled carbon nanotubes using a special combination of two polymers. The technical solution, implementation process, and principles thereof will be further illustrated hereinafter.

An aspect of an embodiment of the disclosure provides a method for improving a yield of selective dispersion of semiconducting carbon nanotubes, including: fully mixing single walled carbon nanotube samples, a first polymer, and a second polymer in a solvent to form a liquid phase mixed system, enabling the single walled carbon nanotube samples to be fully dispersed in the liquid phase mixed system, centrifuging the liquid phase mixed system, and separating a supernatant to implement selective separation of the semiconducting single walled carbon nanotube;
where both the first polymer and the second polymer can be dissolved in the solvent, and can specifically bind to the semiconducting single walled carbon nanotubes; a speed of binding the first polymer to the semiconducting single walled carbon nanotubes is greater than a speed of binding the second polymer to the semiconducting single walled carbon nanotubes; and a binding strength between the first polymer and the semiconducting single walled carbon nanotubes is less than a binding strength between the second polymer and the semiconducting single walled carbon nanotubes.

The disclosure achieves high-yielding preparation of high-purity semiconducting single walled carbon nanotubes (may also be considered as efficient and highly selective separation) using a combination of two or more polymers, and using differences between speeds and capacities of binding the polymers as dispersants to the semiconducting single walled carbon nanotubes. For example, one dispersant thereof has stronger interaction with the single walled carbon tubes, while another dispersant has a faster coating rate. The disclosure can greatly reduce the costs in selective separation of the semiconducting single walled carbon tubes, and improve the repeatability and stability of the separation.

The first polymer may be preferably selected from, but is not limited to, rigid molecules, such as polycarbazole (PCO), or polyfluorene, and has a weaker capacity of binding to carbon nanotubes than the second polymer.

Preferably, the second polymer may be preferably selected from, but is not limited to, flexible molecules, such as polythiophene (rr-P3DDT), or fluorene-thiophene copolymer, and has a stronger capacity of binding to carbon nanotubes than the first polymer.

Preferably, a mass ratio of the first polymer to the second polymer is 0.5-2.0:1.

In some embodiments, the single walled carbon nanotube sample includes a metallic single walled carbon nanotube and a semiconducting single walled carbon nanotube.

More preferably, a mass ratio of the first polymer to the second polymer to the single walled carbon tube is 4:2:1-2:4:1.

Specifically, the solvent includes, but is not limited to, non-polar solvents, such as methylbenzene, or cyclohexane.

As one of the preferred embodiments, a concentration of the first polymer, and the second polymer in the liquid phase mixed system is 0.2-1.0 mg/mL.

Preferably, the method further includes: ultrasonically processing the liquid phase mixed system at a temperature of 5-20° C., at a power of 3-10 W/mL for a duration of 0.5-2 hours, to enable the single walled carbon nanotube samples to be fully dispersed in the liquid phase mixed system.

Preferably, the centrifuging condition includes: a centrifugal speed of 20000-100000 g, and a duration of 0.5-2 hours.

Preferably, a purity of the semiconducting single walled carbon nanotube contained in the supernatant is 90% or more, more preferably 99%-99.9%.

Another aspect of an embodiment of the disclosure provides a reagent for selective separation of semiconducting carbon nanotubes, including a first polymer and a second polymer capable of specifically binding to the semiconducting single walled carbon nanotubes in a selected liquid phase environment. A speed of binding the first polymer to the semiconducting single walled carbon nanotubes is greater than a speed of binding the second polymer to the semiconducting single walled carbon nanotubes, and a binding strength between the first polymer and the semiconducting single walled carbon nanotubes is less than a binding strength between the second polymer and the semiconducting single walled carbon nanotubes; and the selected liquid phase environment includes a mixed solution of the first polymer, and the second polymer.

Preferably, the first polymer includes rigid molecules, such as polycarbazole (PCO), or polyfluorene, and has a capacity of binding to semiconducting single walled carbon nanotubes weaker than the second polymer.

Preferably, the second polymer includes flexible molecules, such as polythiophene (rr-P3DDT), or fluorene-thiophene copolymer, and has a capacity of binding to semiconducting small walled carbon nanotubes stronger than the first polymer.

Preferably, a mass ratio of the first polymer to the second polymer is in a range of 0.5-2.0:1.

The technical solution of the disclosure is further illustrated hereinafter by referring to a number of examples and the accompanying drawings.

Example 1

In the example, the dual polymer system is selected from polycarbazole (PCO) and polythiophene (rr-P3DDT), which are respectively represented by formula:

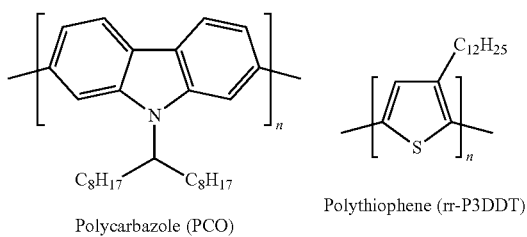

Polycarbazole (PCO)

Polythiophene (rr-P3DDT)

(1) Polycarbazole, polythiophene, and single walled carbon nanotube samples were mixed at a ratio of 2:2:1, and then a certain amount of methylbenzene was added to the resulting mixture, to enable polycarbazole and polythiophene to be at a concentration of 0.5 mg/mL; and (2) The mixed solution was placed in a probe sonicator for ultrasonic processing at a temperature of 20° C. at a power of 3-10 W/ml for a duration of 0.5-2 h. On completion of the ultrasonic processing, the solution was centrifuged with a centrifugal by a centrifugal force of 20000-100000 g for 0.5-2 h, and finally 80% supernatant was taken out, to obtain a semiconducting single walled carbon nanotube solution having a purity of higher than 99% at a concentration of more than 50 ug/mL.

Figure 2:
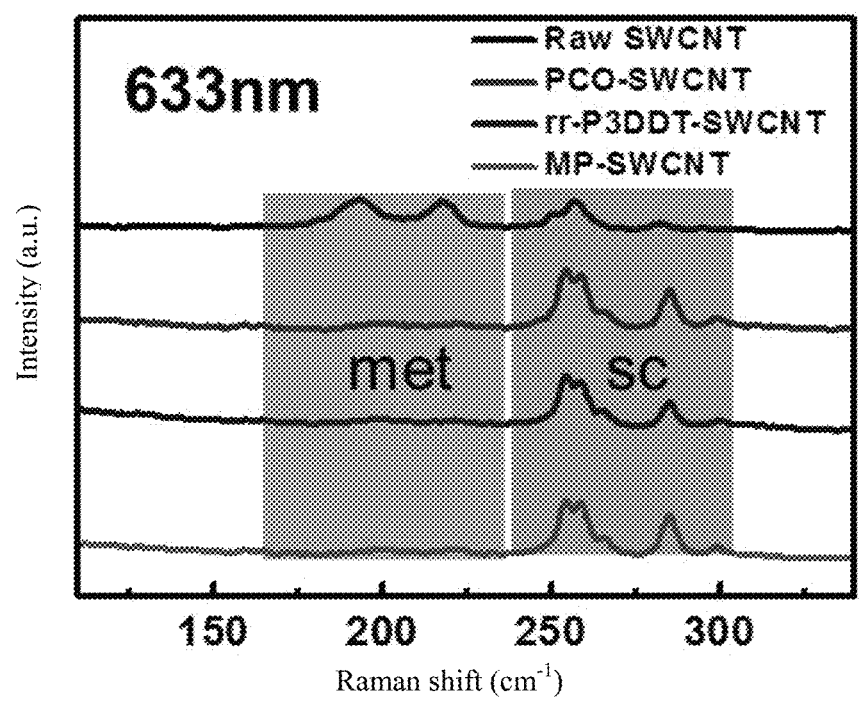
FIG. 2 is Raman spectra of a single walled carbon nanotube, and single walled carbon nanotubes dispersively separated respectively using PCO, rr-P3DDT, and a mixture of PCO/rr-P3DD.

FIG. 1 is absorption spectra of single walled carbon nanotubes dispersively separated respectively using PCO, rr-P3DDT, and a mixture of PCO/rr-P3DD; and FIG. 2 is Raman spectra of a single walled carbon nanotube, and single walled carbon nanotubes dispersively separated using PCO, rr-P3DDT, and a mixture of PCO/rr-P3DD.

Example 2

(1) Polyfluorene, polythiophene, and single walled carbon nanotube samples were mixed at a ratio of 2:2:1, and then a certain amount of methylbenzene was added to the resulting mixture, to enable polycarbazole and polythiophene to be at a concentration of 0.5 mg/mL; and (2) The mixed solution was placed in a probe sonicator for ultrasonic processing at a temperature of 20° C. at a power of 3-10 W/ml for a duration of 0.5-2 h. On completion of the ultrasonic processing, the solution was centrifuged with a centrifugal by a centrifugal force of 20000-100000 g for 0.5-2 h, and finally 80% supernatant was taken out, to obtain a semiconducting single walled carbon nanotube solution having a purity of higher than 99% at a concentration of more than 50 ug/mL.

Figure 3:
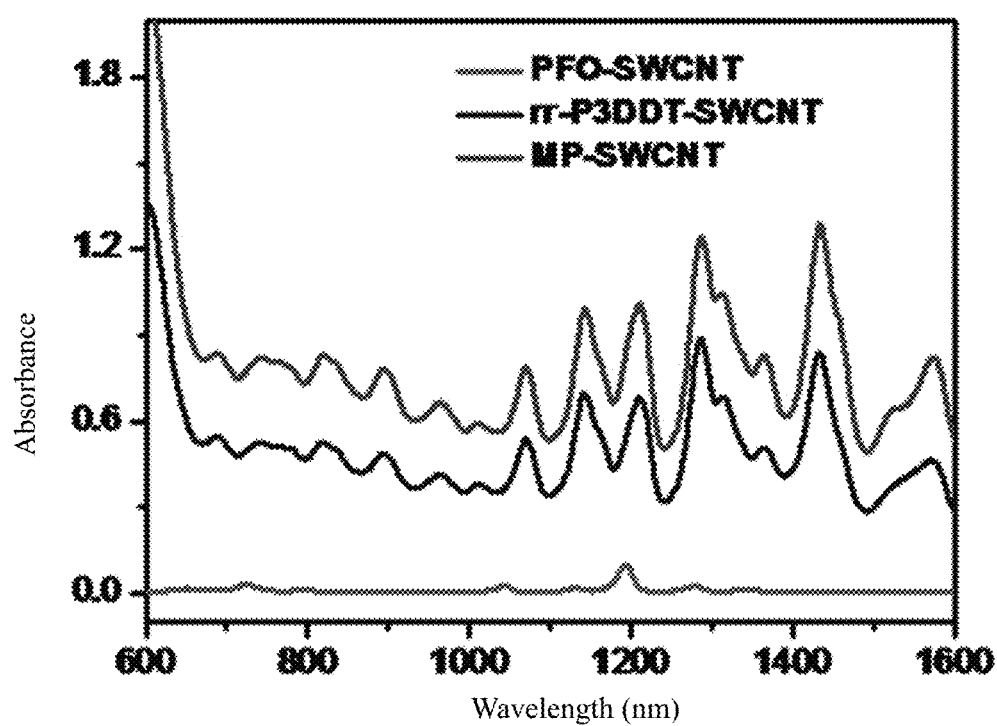
FIG. 3 is absorption spectra of single walled carbon nanotubes dispersively separated respectively using PFO, rr-P3DDT, and a mixture of PFO/rr-P3DD.

FIG. 3 is absorption spectra of single walled carbon nanotubes dispersively separated respectively using PFO, rr-P3DDT, and a mixture of PFO/rr-P3DD.

Furthermore, the inventor of the disclosure has also proved through a series of other experiments using other starting materials and process conditions mentioned in the description by referring to the solution of the preceding examples 1-2 that any experiment can achieve high-yielding separation of high-purity semiconducting single walled carbon nanotubes.

As can be concluded from the above examples and drawings, the disclosure designs a dual polymer system, and can achieve high-yielding, and efficient selective separation of high-purity semiconducting single walled carbon nanotubes from the dynamic perspective of the dispersion process by dispersing single walled carbon nanotubes using a special combination of two polymers, thereby greatly reducing the costs in selective separation of the semiconducting single walled carbon nanotubes, and improving the repeatability and stability of the separation.

It should be noted that only some embodiments of the disclosure are provided hereinabove. For those with ordinary skills in the art, they can still make other modifications and improvements without departing from the creative concept of the disclosure, and all these fall within the scope of protection of the disclosure.

What is claimed is:

1. A method for improving a yield of selective dispersion of semiconducting carbon nanotubes, comprising:
   fully mixing single walled carbon nanotube samples, a first polymer, and a second polymer in a solvent to form a liquid phase mixed system,
   enabling the single walled carbon nanotube samples to be fully dispersed in the liquid phase mixed system,
   centrifuging the liquid phase mixed system, and
   separating a supernatant to implement selective separation of the semiconducting single walled carbon nanotubes;
   wherein
   both the first polymer and the second polymer can be dissolved in the solvent, and can specifically bind to the semiconducting single walled carbon nanotubes;
   a speed of binding the first polymer to the semiconducting single walled carbon nanotubes is greater than a speed of binding the second polymer to the semiconducting single walled carbon nanotubes;
   a binding strength between the first polymer and the semiconducting single walled carbon nanotubes is less than a binding strength between the second polymer and the semiconducting single walled carbon nanotubes, and
   a mass ratio of the first polymer to the second polymer is 0.5-2.0:1.

2. The method for improving a yield of selective dispersion of semiconducting carbon nanotubes according to claim 1, wherein the first polymer comprises any one of polycarbazole, or polyfluorene.

3. The method for improving a yield of selective dispersion of semiconducting carbon nanotubes according to claim 1, wherein the second polymer comprises any one of polythiophene, or fluorene-thiophene copolymer.

4. The method for improving a yield of selective dispersion of semiconducting carbon nanotubes according to claim 1, wherein the single walled carbon nanotube samples comprise a metallic single walled carbon nanotube and a semiconducting single walled carbon nanotube.

5. The method for improving a yield of selective dispersion of semiconducting carbon nanotubes according to claim 1, wherein the solvent comprises a nonpolar solvent.

6. The method for improving a yield of selective dispersion of semiconducting carbon nanotubes according to claim 5, wherein the nonpolar solvent comprises any one of methylbenzene, or cyclohexane.

7. The method for improving a yield of selective dispersion of semiconducting carbon nanotubes according to claim 1, wherein a concentration of the first polymer, and the second polymer in the liquid phase mixed system is 0.2-1.0 mg/m L.

8. The method for improving a yield of selective dispersion of semiconducting carbon nanotubes according to claim 1, comprising: ultrasonically processing the liquid phase mixed system at a temperature of 5-20° C., at a power of 3-10 W/mL for a duration of 0.5-2 hours, to enable the single walled carbon nanotube samples to be fully dispersed in the liquid phase mixed system.

9. The method for improving a yield of selective dispersion of semiconducting carbon nanotubes according to claim 1, wherein the centrifuging condition comprises: a centrifugal speed of 20000-100000 g, and a duration of 0.5-2 hours.

10. The method for improving a yield of selective dispersion of semiconducting carbon nanotubes according to claim 1, wherein a purity of the semiconducting single walled carbon nanotubes included in the supernatant is 99%-99.9%.

11. A reagent for selective separation of semiconducting carbon nanotubes, comprising:
a first polymer and a second polymer capable of specifically binding to the semiconducting single walled carbon nanotubes in a selected liquid phase environment,
a speed of binding the first polymer to the semiconducting single walled carbon nanotube being greater than a speed of binding the second polymer to the semiconducting single walled carbon nanotube,
a binding strength between the first polymer and the semiconducting single walled carbon nanotube being less than a binding strength between the second polymer and the semiconducting single walled carbon nanotube; and
the selected liquid phase environment comprising a mixed solution of the first polymer, and the second polymer, wherein a mass ratio of the first polymer to the second polymer is 0.5-2.0:1.

12. The reagent for selective separation of semiconducting carbon nanotubes according to claim 11, wherein the first polymer comprises any one of polycarbazole, or polyfluorene.

13. The reagent for selective separation of semiconducting carbon nanotubes according to claim 11, wherein the second polymer comprises any one of polythiophene, or fluorene-thiophene copolymer.

14. A method for improving a yield of selective dispersion of semiconducting carbon nanotubes, comprising:
fully mixing single walled carbon nanotube samples, a first polymer, and a second polymer in a solvent to form a liquid phase mixed system,
enabling the single walled carbon nanotube samples to be fully dispersed in the liquid phase mixed system,
centrifuging the liquid phase mixed system, and
separating a supernatant to implement selective separation of the semiconducting single walled carbon nanotubes;
wherein
both the first polymer and the second polymer can be dissolved in the solvent, and can specifically bind to the semiconducting single walled carbon nanotubes;
a speed of binding the first polymer to the semiconducting single walled carbon nanotubes is greater than a speed of binding the second polymer to the semiconducting single walled carbon nanotubes;
a binding strength between the first polymer and the semiconducting single walled carbon nanotubes is less than a binding strength between the second polymer and the semiconducting single walled carbon nanotubes, and
a mass ratio of the first polymer to the second polymer to the single walled carbon nanotubes is 4:2:1-2:4:1.

* * * * *